US010554089B2

(12) United States Patent
Liu et al.

(10) Patent No.: US 10,554,089 B2
(45) Date of Patent: Feb. 4, 2020

(54) ELECTRIC MOTOR AND GIMBAL APPLIED WITH SUCH ELECTRIC MOTOR (71) Applicant: ZEROTECH (SHENZHEN) INTELLIGENCE ROBOT CO., LTD., Shenzhen (CN)

(72) Inventors: Gengpeng Liu, Beijing (CN); Hongtao Sun, Beijing (CN)

(73) Assignee: ZEROTECH (SHENZHEN) INTELLIGENCE ROBOT CO., LTD., Shenzhen (CN)

( * ) Notice: Subject to any disclaimer, the term of this patent is extended or adjusted under 35 U.S.C. 154(b) by 685 days.

(21) Appl. No.: 15/205,216

(22) Filed: Jul. 8, 2016

(65) Prior Publication Data
US 2017/0338710 A1 Nov. 23, 2017

(30) Foreign Application Priority Data
May 17, 2016 (CN) ...................... 2016 2 0449324 U (51) Int. Cl.
H02K 5/04 (2006.01)
H02K 11/215 (2016.01)
B64C 39/02 (2006.01)
H02K 3/04 (2006.01)
H02K 7/00 (2006.01)

(52) U.S. Cl.
CPC ............. *H02K 5/04* (2013.01); *B64C 39/024* (2013.01); *H02K 3/04* (2013.01); *H02K 7/003* (2013.01); *H02K 11/215* (2016.01); *B64C 2201/00* (2013.01)

(58) Field of Classification Search
CPC .............. B64C 39/024; B64C 2201/00; B64C 2201/123; H02K 11/215; H02K 3/04; H02K 5/04; H02K 7/003; H04N 5/225; H04N 5/2253
USPC .... 310/67 R, 75 R, 97, 98, 68 B, 36, 89, 72, 310/114; 348/373, 374, 375, 357, 24.99, 348/143, 151; 396/6, 12, 13
See application file for complete search history.

(56) References Cited

U.S. PATENT DOCUMENTS

| 3,753,180 A * | 8/1973 | Sommer ................. H01F 7/145 310/46 |
| 5,216,557 A * | 6/1993 | Elsaesser ............. G11B 17/038 360/99.08 |
| 5,623,382 A * | 4/1997 | Moritan ................ F16C 17/107 310/51 |
| 5,845,390 A * | 12/1998 | Cheng .................... H02K 3/525 29/596 |

(Continued)

FOREIGN PATENT DOCUMENTS

CN 104158378 * 11/2014

*Primary Examiner* — Mang Tin Bik Lian
*Assistant Examiner* — Ahmed Elnakib
(74) *Attorney, Agent, or Firm* — Scully Scott Murphy & Presser (57) ABSTRACT An electric motor, a gimbal and an unmanned aerial vehicle. The electric motor includes: a stator assembly; and a rotor assembly rotatably connected with the stator assembly. The stator assembly includes a stator housing for installation of a stator, the rotor assembly includes a rotor housing for installation of a rotor, and at least one of the stator housing and the rotor housing has a connecting arm. The gamble includes an electric motor group. At least one electric motor in the electric motor group is the above electric motor.

15 Claims, 4 Drawing Sheets (56) References Cited

U.S. PATENT DOCUMENTS

| | | | | | |
|---|---|---|---|---|---|
| 5,977,671 | A | * | 11/1999 | Kim | H02K 29/08 |
| | | | | | 310/101 |
| 6,628,338 | B1 | * | 9/2003 | Elberbaum | G08B 13/1963 |
| | | | | | 348/373 |
| 7,000,883 | B2 | * | 2/2006 | Mercadal | F16M 11/10 |
| | | | | | 248/660 |
| 2005/0180742 | A1 | * | 8/2005 | Jeong | G03B 9/08 |
| | | | | | 396/451 |
| 2007/0159030 | A1 | * | 7/2007 | Naganuma | H02K 1/243 |
| | | | | | 310/49.08 |
| 2008/0278578 | A1 | * | 11/2008 | Kahn | F16M 11/10 |
| | | | | | 348/143 |
| 2012/0032545 | A1 | * | 2/2012 | Hsu | H02K 7/12 |
| | | | | | 310/103 |
| 2014/0037278 | A1 | * | 2/2014 | Wang | F16M 11/10 |
| | | | | | 396/55 |
| 2014/0197717 | A1 | * | 7/2014 | Busch | H02K 1/14 |
| | | | | | 310/68 D |
| 2014/0312745 | A1 | * | 10/2014 | Nicoloff | H02K 29/03 |
| | | | | | 310/67 R |
| 2015/0097950 | A1 | * | 4/2015 | Wang | H04N 5/23287 |
| | | | | | 348/144 |
| 2017/0191613 | A1 | * | 7/2017 | Liu | B64D 47/08 |
| 2017/0192342 | A1 | * | 7/2017 | Liu | G03B 17/561 |
| 2017/0336700 | A1 | * | 11/2017 | Liu | F16M 11/12 |

* cited by examiner

ELECTRIC MOTOR AND GIMBAL APPLIED WITH SUCH ELECTRIC MOTOR

TECHNICAL FIELD

Embodiments of the present disclosure relate to an electric motor and a gimbal applied with such an electric motor.

BACKGROUND

Generally, an electric motor often has a complicate structure. The electric motor and a connecting arm are separated parts, such that when the electric motor is to be assembled into a gimbal, the assembling process is troublesome and complicate and a large space may be occupied. A restricting mechanism for controlling a rotating range of a rotor is a restricting member disposed externally which occupies space outside the electric motor. Moreover, the connecting arm has a relative large dimension and a relative large weight, causing the electric motor to have a relative large weight. When such an electric motor is applied in a gimbal, it's not beneficial for miniaturization and weight reduction of the gimbal.

SUMMARY

Embodiments of the present disclosure provide an electric motor, including: a stator assembly; and a rotor assembly rotatably connected with the stator assembly. The stator assembly includes a stator housing for installation of a stator, the rotor assembly includes a rotor housing for installation of a rotor, and at least one of the stator housing and the rotor housing has a connecting arm.

Embodiments of the present disclosure provide a gimbal that includes an electric motor group. At least one electric motor in the electric motor group is the electric motor described above.

Embodiments of the present disclosure further provide an unmanned aerial vehicle (UAV). The UAV includes the gimbal described above.

BRIEF DESCRIPTION OF THE DRAWINGS

In order to illustrate the technical solutions in the embodiments of the present disclosure more clearly, the drawings need to be used in the description of the embodiments will be briefly described in the following; it is understood that the drawings described below are only related to some embodiments of the present disclosure and are not considered as limitations for the scope. For one ordinary skilled person in the art, other drawings can be obtained according to these drawings without making additional creative effort.

IN THE FIGURES

Electric motor 100, stator assembly 200, stator 210, iron core 211, winding 212, iron core surface 213, stator housing 220, stator sidewall 221, stator bottom wall 222, mounting hole 223, rotor assembly 300, rotor 310, rotating shaft 320, rotor housing 330, rotor sidewall 331, rotor bottom wall 332, bearing 400, bearing hole 430, restricting mechanism 500, rotating member 510, stopper member 520, first end 521, second end 522, connecting arm 600, stator turning arm 610, lug boss 611, rotor turning arm 620, magnetic ring 710, top surface 711, circumferential surface 712, magnetic encoder 720, electric motor 800, rotor assembly 810, rotor housing 830, rotor sidewall 831, rotor bottom wall 832, sleeve 840, electric motor 900, rotating member 910, first rotating member 911, second rotating member 912, collar 913, stopper member 920, gimbal 1000, first electric motor 1011, second electric motor 1012, third electric motor 1013, first connecting arm 1021, second connecting arm 1022, third connecting arm 1023, fourth connecting arm 1024.

DETAILED DESCRIPTION

Hereafter, the technical solutions of the embodiments of the present disclosure will be described in a clearly and fully understandable way in connection with the drawings related to the embodiments of the invention. It is obvious that the described embodiments are just a part but not all of the embodiments of the present disclosure. Generally, the components of the embodiments of the present disclosure described and illustrated herein can be arranged and designed in various different configurations.

Therefore, the detailed description about the embodiment of the present disclosure provided in the drawings does not intend to restrict the claimed protection scope of the present disclosure, but merely to represent selected embodiments of the present disclosure. Based on the embodiments of the present disclosure, all the other embodiments obtained by the ordinary skilled in this art without any creative labor shall fall into the protection scope of the present disclosure.

It should be noted that: similar reference numerals and letters in the following drawings indicate similar items, and therefore, once one item is defined in a drawing, no further definition and explanation thereof is needed in the subsequent drawings.

In the description of the present disclosure, it is understood that the terms "center", "upper", "lower", "left", "right", "vertical", "horizontal", "inner", "outer" and the like refer to such orientation or positional relationships that are illustrated based on those illustrated in the drawings, or alternatively, are conventional orientation or positional relationships in which the disclosed products are placed; these terms are used merely for the purpose of facilitating and simplifying the description of the present disclosure, rather than indicating or suggesting that the referred devices or elements must have specific orientations, are designed and operated in a specific orientation; and thus the terms can not be understood as restriction upon the present disclosure. Furthermore, the terms "first", "second", "third", and the like are used only for differentiate description, instead of being appreciated as indication or suggestion of relative importance.

Besides, the terms "horizontal", "vertical", "pendant" and the like do not require that the components should be absolutely horizontal or pendant, but can be slightly inclined. For instance, the term "horizontal" only means that its direction is more horizontal with respect to the "vertical" direction, rather than meaning that such a configuration must be completely horizontal; and it can be slightly inclined.

In the description of the present disclosure, it is noted that, unless otherwise specified or limited explicitly, the terms "providing", "mounting", "coupling", "connecting" and so on should be understood in a broad sense, for example, it may be a fixed connection, a detachable connection, or an integral connection; it may be a mechanical connection, or may be an electrical connection; it may be a direct connection, and may also be an indirect connection through intermediate medium, or may be an internal communication between two elements. Those with ordinary skills in the art can appreciate the specific meanings of the above terms in the present disclosure according to specific situations.

Embodiments of the present disclosure provide an electric motor which has a simple configuration and a relative small volume and is easier to be assembled, a gimbal that is applied with the above electric motor, and a UAV that is applied with the gimbal.

First Embodiment

Figure 1:
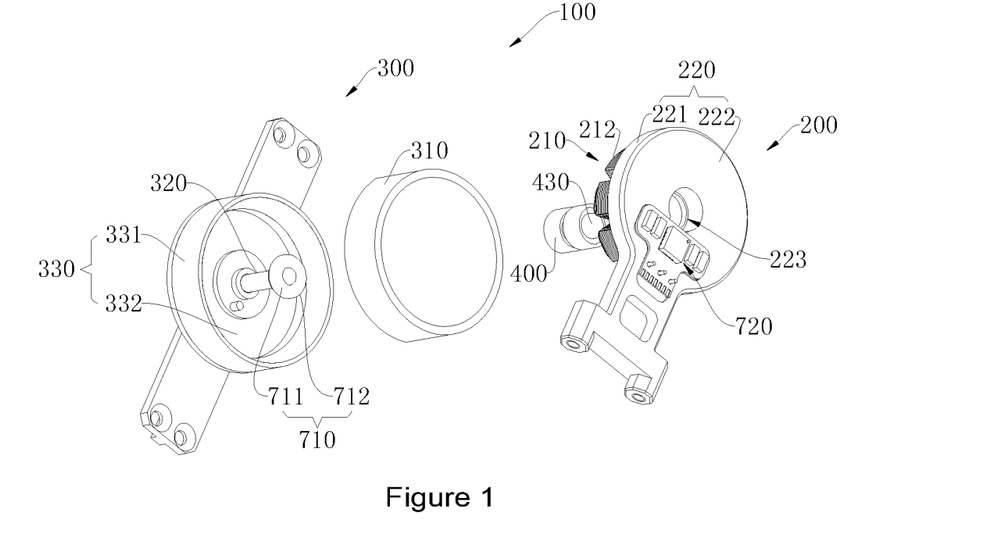
FIG. 1 is an exploded perspective schematic view of an electric motor according to a first embodiment of the present disclosure.
Figure 2:
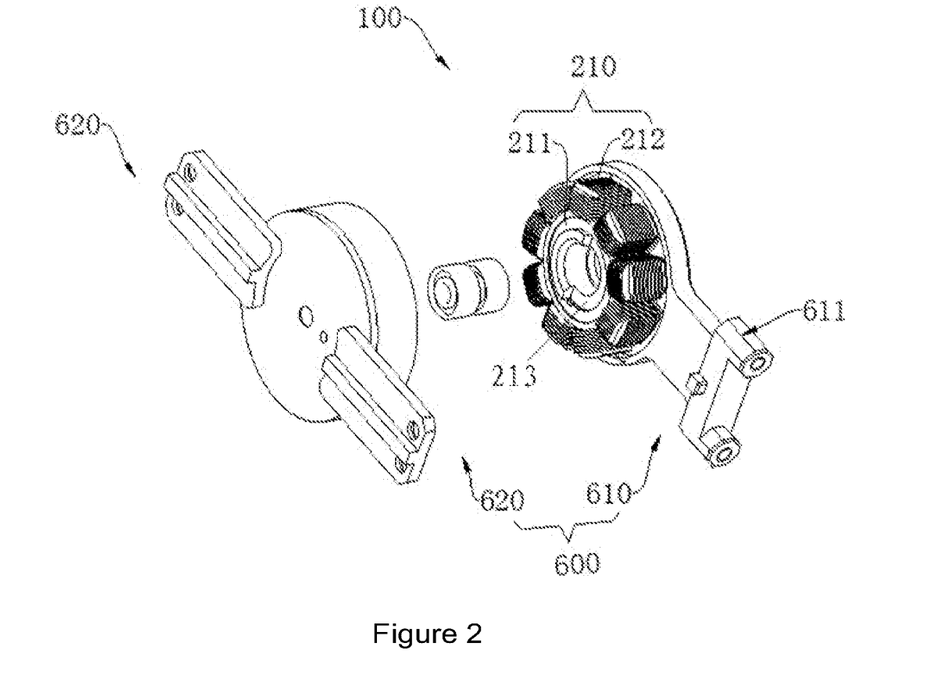
FIG. 2 is another exploded perspective schematic view of the electric motor according to the first embodiment of the present disclosure.
Figure 3:
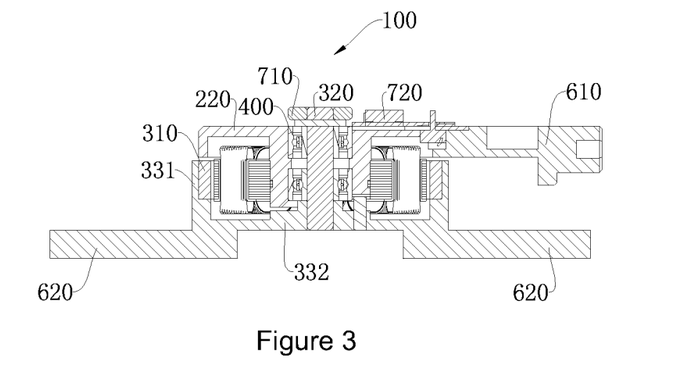
FIG. 3 is a schematic sectional view of the electric motor in the first embodiment of the present disclosure when a stator assembly and a rotor assembly are assembled into the electric motor.

Referring to FIGS. 1 to 3, this embodiment provides an electric motor 100 including a stator assembly 200 and a rotor assembly 300 rotatably connected with the stator assembly 200.

The stator assembly 200 includes a stator 210 and a stator housing 220, and a stator 210 is installed to the stator housing 220.

The stator 210 includes an iron core 211 and a multiple of windings 212 are disposed around the iron core 211, and the multiple of windings 212 are arranged in a ring with a center to be a circle center of the iron core 211.

The stator housing 220 includes a stator sidewall 221 with a tubular shape and a stator bottom wall 222 connected to the stator sidewall 221. The stator sidewall 221 and the stator bottom wall 222 cooperatively form a receiving space to install the stator 210. A mounting hole 223 is defined on a centre of the stator bottom wall 222 for installation of a bearing 400.

The rotor assembly 300 includes a rotor 310 and a rotor housing 330 for the installation of the rotor 310, and the rotor 310 is connected inside a receiving space of the rotor housing 330.

The rotor 310 is a magnetic steel with a tubular shape. An air gap exists between the rotor 310 and the stator 210. The rotor 310 produces sufficient magnetic induction intensity in the air gap and interacts with the energized stator windings 212 to produce induced electric potential so as to drive the rotor 310 to rotate. The rotor housing 330 includes a tubular rotor sidewall 331 and a rotor bottom wall 332 connected to the rotor sidewall 331. The rotor sidewall 331 and the rotor bottom wall 332 form a receiving space for the installation of the rotor 310.

In this embodiment, the electric motor 100 employs an inner stator and an outer rotor. That is, the rotor surrounds the stator, and the rotor causes a greater torque. In other embodiments, an outer stator and an inner rotor may be employed; that is, the stator surrounds the rotor.

The electric motor 100 further includes the bearing 400 disposed in the mounting hole 223 opened in the stator bottom wall 222. A rotating shaft 320 of the rotor 310 is disposed in a bearing hole 430 of the bearing 400, and the rotating shaft 320 cooperates with the bearing hole 430 in such a way that the rotating shaft 320 is rotationally connected in the bearing hole 430.

Figure 4:
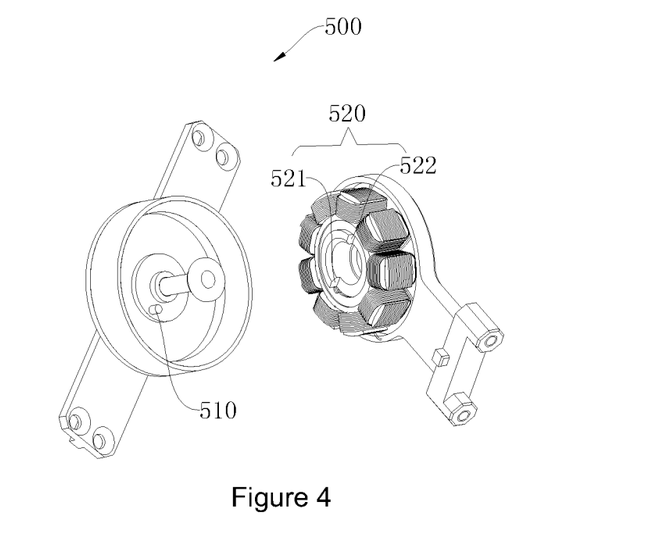
FIG. 4 is an exploded perspective schematic view of the electric motor in the first embodiment of the present disclosure with a restricting mechanism being labeled out.

Referring to FIG. 4, the electric motor 100 further includes a restricting mechanism 500 including a rotating member 510 and a stopper member 520 for confining a rotation range of the rotating member 510. The rotating member 510 is provided in an inner side of the rotor housing 330, and the stopper member 520 is provided in an inner side of the stator housing 220.

The rotating member 510 has a rod shape. The rotating member 510 is extended from an inner surface of the rotor bottom wall 332 along an axial direction of the rotor bottom wall 332. The rotating member 510 is connected to the inner side of the rotor bottom wall 332. The rotating member 510 is close to the rotating shaft 320 and is separated from the rotating shaft 320. When the stator assembly 200 cooperates with the rotor assembly 300, the rotating member 510 locates between the stator windings 212 and the rotating shaft 320. The stopper member 520 is an arc-like block piece extending from an iron core surface 213 along an axial direction of the stator bottom wall 222. The stopper member 520 is connected to the iron core surface 213; the stopper member 520 has a first end 521 and a second end 522, and the rotating member 510 locates between the first end 521 and the second end 522. For example, the iron core surface 213 is a surface of the iron core 211.

The rotating member 510 can rotate between the first end 521 and the second end 522. When the rotating member 510 rotates in a first direction and bumps into the first end 521, the stopper member 520 blocks the rotating member 510 from continuing rotating in the first direction; when the rotating member 510 rotates in a second direction and bumps into the second end 522, the stopper member 520 blocks the rotating member 510 from continuing rotating in the second direction. In this embodiment, the first direction is a clockwise direction, and the second direction is a counterclockwise direction. In this embodiment, the rotating member 510 rotates between the positive 90 degrees and the negative 90 degrees. In some other embodiments, the rotating member 510 can rotate between the positive 45 degrees and the negative 45 degrees. In still some other embodiments, the rotating member 510 can rotate between the positive 40 degrees and the negative 40 degrees. The rotation range of the rotating member 510 can be determined according to the structural shape of the stopper member 520.

The rotating member 510 and the stopper member 520 of the restricting mechanism 500 are located within the electric motor 100, respectively. The restricting mechanism 500 makes full use of the inner space of the electric motor 100. Comparing with a restricting mechanism located outside the electric motor, the restricting mechanism 500 in this embodiment saves the space outside the electric motor 100 and reduces the volume of the electric motor 100. Thus, the electric motor 100 is more miniaturized. When the electric motor 100 is assembled into a gimbal, the resultant gimbal is more miniaturized.

Still referring to FIGS. 1 to 3, a connecting arm 600 is a connecting piece that connects two parts or devices. A connecting arm 600 on the stator assembly 200 is used for connecting the stator assembly 200 with other components or devices beside the stator assembly 200. A connecting arm 600 on the rotor assembly 300 is used for connecting the rotor assembly 300 with other components or devices beside the rotor assembly 300.

The shape of the connecting arm 600 can be selected as needed. For example, the shape of the connecting arm 600 may be a rectangular block, a cylinder or other shapes. The connecting arm 600 can be a solid part, a hollow part or a hollowed-out solid part. The connecting arm 600 is provided on at least one of the stator assembly 200 and the rotor assembly 300. At least one of the stator assembly 200 and the rotor assembly 300 can be provided with the connecting arm 600 as needed.

In this embodiment, the stator assembly 200 and the rotor assembly 300 have connecting arms 600 respectively, where a connecting arm 600 provided on the stator assembly 200 is referred to as a stator turning arm 610, and a connecting arm 600 provided on the rotor assembly 300 is referred to as a rotor turning arm 620. For example, the connecting arm 600 includes the stator turning arm 610 provided on the stator assembly 200 and the rotor turning arm 620 provided on the rotor assembly 300. In other embodiments, only one of the stator assembly 200 and the rotor assembly 300 has connecting arms 600. For example, only the rotor assembly 300 has a connecting arm 600 (that is, the rotor turning arm 620), and the stator assembly 200 does not have any connecting arm 600; or alternatively, only the stator assembly 200 has a connecting arm 600 (that is, the stator turning arm 610), and the rotor assembly 300 does not have any connecting arm 600.

It is to be appreciated that the number of the connecting arms 600 of the electric motor 100 can be selected according to the assembling requirement of the gimbal. In this embodiment, the stator assembly 200 has one stator turning arm 610, and the rotor assembly 300 has two rotor turning arms 620. In other embodiments, when the stator assembly 200 has stator turning arms 610, the stator assembly 200 can have more than one stator turning arm 610; and when the rotor assembly 300 has rotor turning arms 620, the rotor assembly 300 can have one or more rotor turning arms 620.

In this embodiment, the stator turning arm 610 and the stator housing 220 are made from identical materials, and the rotor turning arm 620 and the rotor housing 330 are made from identical materials. In this embodiment, the stator turning arm 610 and the stator housing 220 are made from steel materials, and the rotor turning arm 620 and the rotor housing 330 are made from steel materials. In some other embodiments, the stator turning arm 610 and the stator housing 220 are made from aluminum or aluminum alloys, and the rotor turning arm 620 and the rotor housing 330 are made from aluminum or aluminum alloys. In still some other embodiments, the stator turning arm 610 and the stator housing 220 are made from plastic materials, and the rotor turning arm 620 and the rotor housing 330 are made from plastic materials. For example, a plastic material may include, but is not limited to, one of the polyethylene, polypropylene, polyvinyl chloride or polystyrene.

In this embodiment, the stator turning arm 610 and the stator housing 220 are a one-piece component formed as a whole, and the rotor turning arm 620 and the rotor housing 330 are a one-piece component formed as a whole. For example, the stator sidewall 221 of the stator housing 220, the stator bottom wall 222 of the stator housing 220, and the stator turning arm 610 are a one-piece component formed as a whole. The rotor sidewall 331 of the rotor housing 330, the rotor bottom wall 332 of the rotor housing 330, and the rotor turning arm 620 are a one-piece component formed as a whole.

Founding, forging, injection molding and other one-piece forming manners can be used for forming the stator housing 220 and the stator turning arm 610. And, founding, forging, injection molding and other one-piece forming manners can also be used for forming the rotor housing 330 and the rotor turning arm 620. Its beneficial effects include: when several electric motors 100 are assembled into a gimbal, the step of connecting the stator sidewall 221, the stator bottom wall 222 and the stator turning arm 610 together is eliminated, and the step of connecting the rotor sidewall 331, the rotor bottom wall 332 and the rotor turning arm 620 together is also eliminated. Thus, an assembling efficiency of the gimbal is improved.

In other embodiments, the stator turning arm 610 may also be connected to the stator bottom wall 222 by connecting manners including adhesive bonding, welding, riveting, threaded connection, etc. The stator bottom wall 222 may also be connected to the stator sidewall 221 by adhesive bonding, welding, riveting, threaded connection or other connecting manners. The rotor turning arm 620 may also be connected to the rotor bottom wall 332 by connecting manners including adhesive bonding, welding, riveting, threaded connection, etc. The rotor bottom wall 332 may also be connected to the rotor sidewall 331 by adhesive bonding, welding, riveting, threaded connection or other connecting manners.

One end of the stator turning arm 610 is connected to the stator housing 220. For example, the stator turning arm 610 is connected to the stator sidewall 221 or the stator bottom wall 222. In this embodiment, the stator turning arm 610 extends from the stator sidewall 221 along a radial direction of the stator bottom wall 222. Another end of the stator turning arm 610 is opened with an installation part for the installation of a fastener, and the stator turning arm 610 is connected to other parts or other devices through the fastener (not shown in the figure).

In this embodiment, the stator turning arm 610 has a lug boss 611 which includes mounting holes for the installation of fasteners. The lug boss 611 extends at both sides of the stator turning arm 610 along a direction away from the stator turning arm 610, so that it is much easier to install the fasteners at both sides of the stator turning arm 610. In other embodiments, the stator turning arm 610 may have no lug boss 611, and the mounting holes for the installation of the fasteners can be directly opened on the stator turning arm 610.

The rotor turning arm 620 is disposed on the rotor bottom wall 332 and extends along the radial direction of the rotor bottom wall 332; that is, the rotor turning arm 620 extends from a side of the rotor bottom wall 332 and towards an opposite direction. One end of the rotor turning arm 620 is connected to the rotor housing 330. For example, the rotor turning arm 620 is connected to the rotor sidewall 331 or the rotor bottom wall 332. Another end of the rotor turning arm 620 is opened with mounting holes for the installation of fasteners, and the rotor turning arm 620 is connected to other parts or other devices through the fasteners (not shown in the figure).

Referring to FIGS. 1 and 3, the electric motor 100 further includes a magnetic ring 710 and a magnetic encoder 720 for encoding a position of the magnetic ring 710. The magnetic ring 710 includes a top surface 711 and a circumferential surface 712, and the top surface 711 is in parallel with the stator bottom wall 222. The magnetic ring 710 is fixed to one end of the rotating shaft 320, the magnetic ring 710 is exposed outside the mounting hole 223, and the rotating shaft 320 rotates and causes the magnetic ring 710 to rotate. The magnetic encoder 720 is connected to the stator bottom wall 222. The magnetic encoder 720 is arranged to be separated from the magnetic ring 710 in the radial direction of the stator bottom wall 222.

After the assembly of the electric motor 100, the magnetic encoder 720 faces the circumferential surface 712. For example, the magnetic encoder 720 confronts directly with the circumferential surface 712. Comparing with a magnetic encoder that is located outside the stator bottom wall 222 and directly faces the top surface 711, the magnetic encoder 720 in this embodiment saves the space of the magnetic ring 710 in an axial direction, thereby reducing dimension of the electric motor 100 in the axial direction, and enabling the electric motor 100 to be more miniaturized.

Second Embodiment

Figure 5:
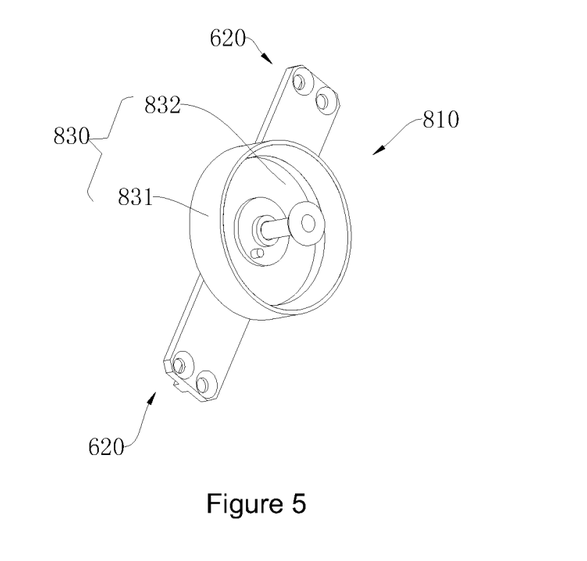
FIG. 5 is a perspective schematic view of a rotor assembly of an electric motor according to a second embodiment of the present disclosure.
Figure 6:
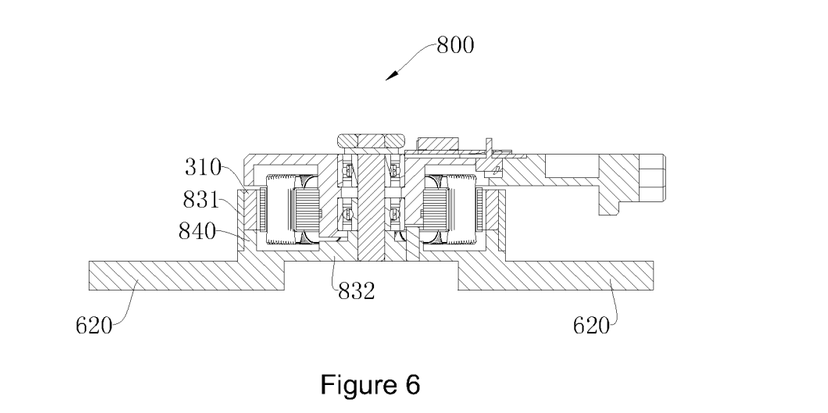
FIG. 6 is a schematic sectional view of the electric motor in the second embodiment of the present disclosure when a stator assembly and a rotor assembly are assembled into the electric motor.

Referring to FIGS. 5 and 6, this embodiment provides an electric motor 800, which is substantially identical to the electric motor 100 in the first embodiment, and the difference between the two includes a different one-piece forming manner of the rotor turning arm and the rotor housing.

In the first embodiment, the rotor housing 330 includes the rotor sidewall 331 and the rotor bottom wall 332; the rotor turning arm 620, the rotor sidewall 331 and the rotor bottom wall 332 are all made from identical materials; and the rotor turning arm 620, the rotor sidewall 331 and the rotor bottom wall 332 are formed as one piece.

However, in this embodiment, the rotor housing 830 and the rotor turning arm 620 are a bimetal component. FIG. 5 shows the rotor assembly 810 of the electric motor 800, and the rotor housing 830 includes a rotor sidewall 831 and a rotor bottom wall 832. The rotor sidewall 831 is made from soft iron, magnetic steel or soft magnetic alloy having a relative high magnetoconductivity. The rotor sidewall 831 itself dose not produce magnetic field but transmits magnetic lines of flux in the magnetic paths so as to play a role of concentrating magnetism and ensuring stability of rotation of the rotor 310. The rotor turning arm 620 and the rotor bottom wall 832 are all made from aluminum so as to reduce the weight of the electric motor 800.

The rotor turning arm 620 and the rotor bottom wall 832 are formed as one piece, and the stator turning arm, the rotor turning arm 620 and the rotor bottom wall 832 can be formed by founding, forging, injection molding and other one-piece forming manners; and then, the rotor bottom wall 332 is integrally connected with the rotor sidewall 331. Therefore, when several electric motors 100 and/or 800 are assembled into a gimbal, the step of connecting the rotor turning arm 620 with the rotor bottom wall 832 is eliminated, thereby improving the assembly efficiency of the gimbal.

The rotor bottom wall 832 is a circular part. One side of the rotor bottom wall 832 is connected to the rotor turning arm 620, and another side of the rotor bottom wall 832 is provided with a sleeve 840. The sleeve 840 has an outer diameter greater than an inner diameter of the rotor sidewall 831. The sleeve 840 is pressed into an inner side of the rotor sidewall 831, and the sleeve 840 is in an interference fit with the rotor sidewall 831.

For example, the rotor sidewall 831 is a hollow cylindrical part, the rotor sidewall 831 has a mounting hole for the sleeve 840, the sleeve 840 has an outer diameter equal to or greater than the inner diameter of the rotor sidewall 831, and the sleeve 840 is in a interference fit with the rotor sidewall 831, so as to fix the rotor bottom wall 832 to the rotor sidewall 831. Thus, the step of connecting the rotor turning arm 620 with the rotor bottom wall 832 is eliminated, resulting in a more simple assembly of the electric motor 800 and an improvement on the assembly efficiency of the gimbal.

In some other embodiments, the rotor bottom wall 832 can be connected to the inner side of the rotor sidewall 831 by connecting manners including adhesive bonding, welding, riveting, threaded connection, etc. In still some other embodiments, the rotor 310 has a mounting hole for the sleeve 840, and the sleeve 840 has an outer diameter equal to or greater than the inner diameter of the rotor 310. The sleeve 840 is in an interference fit with the mounting hole so as to fix the rotor bottom wall 832 to the inner side of the rotor 310.

Third Embodiment

Figure 7:
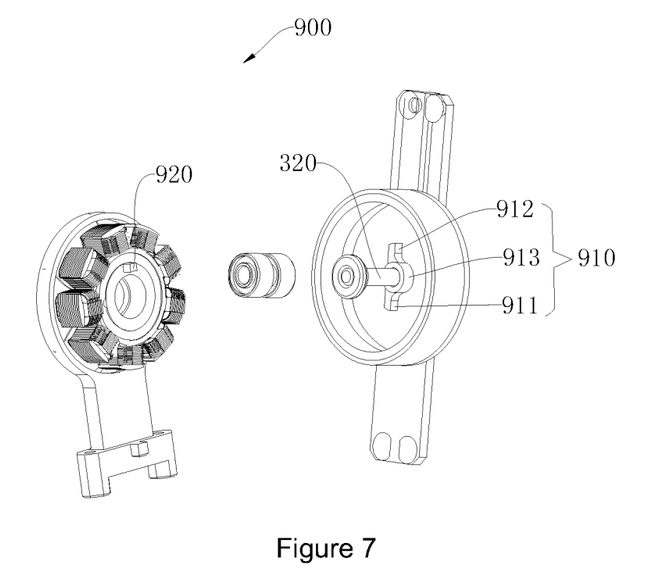
FIG. 7 is an exploded perspective schematic view of the electric motor in the second embodiment of the present disclosure with a restricting mechanism being labeled out.

Referring to FIG. 7, this embodiment provides an electric motor 900 which is substantially identical to the electric motor 100 of the first embodiment having a connecting arm 600. The difference between the electric motor 900 and the electric motor 100 includes different structures for their respective restricting mechanisms.

The stopper member 920 is provided on an inner side of the iron core 211, and the stopper member 920 extends from the iron core surface 213. The shape of the stopper member 920 may be a cylinder, a rectangular block or other shapes.

The rotating member 910 encircles the rotating shaft 320 and rotates together with the rotating shaft 320. The rotating member 910 is fixedly coupled onto the rotor bottom wall 332, and its shape may be a cylinder, a rectangular block or other shapes; the rotating member 910 includes a collar 913 that encircles the rotating shaft 320 and is connected to the inner side of the rotor bottom wall 332. The rotating member 910 further includes a first rotating member 911 and a second rotating member 912 which extend from two sides of the collar 913 respectively.

When the stator assembly 200 cooperates with the rotor assembly 300, the stopper member 920 locates between the first rotating member 911 and the second rotating member 912; when the rotor assembly 300 rotates relatively to the stator assembly 200, the stopper member 920 resists on the first rotating member 911 or the second rotating member 912 rotationally. A diameter of a circle where the rotating member 910 locates is less than or equal to a diameter of a circle where the furthest end of the first rotating member 911 locates, and is also less than or equal to a diameter of a circle where the furthest end of the second rotating member 912 locates.

In this embodiment, the rotating member 910 rotates between the positive 90 degrees and the negative 90 degrees. In some other embodiments, the rotating member 910 can rotate between the positive 45 degrees and the negative 45 degrees. In still some other embodiments, the rotating member 910 can rotate between the positive 40 degrees and the negative 40 degrees.

Figure 8:
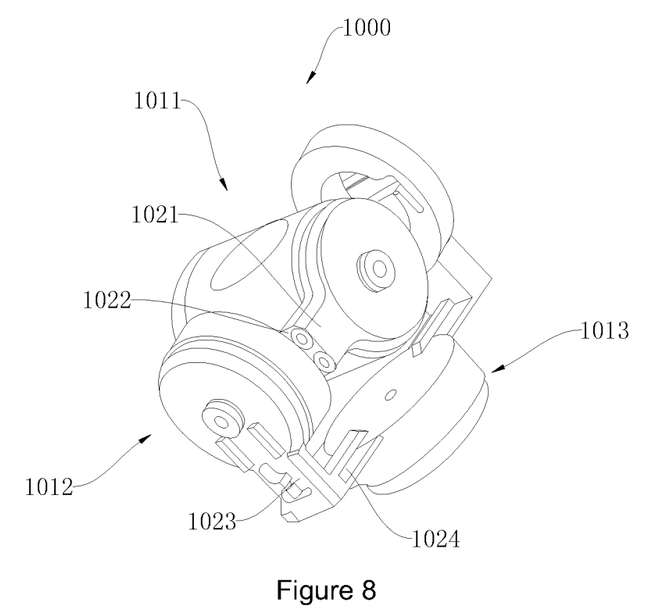
FIG. 8 is a perspective schematic view of a gimbal of the present disclosure.

Referring to FIG. 8, the embodiments of the present disclosure also provide a gimbal 1000 that includes an electric motor group. At least one electric motor in the electric motor group is the electric motor 100, the electric motor 800 or the electric motor 900 in the above embodiments. For example, the electric motor group includes a first electric motor 1011, a second electric motor 1012 and a third electric motor 1013; and at least one of the first electric motor 1011, the second electric motor 1012 and the third electric motor 1013 is the electric motor 100, the electric motor 800 or the electric motor 900 in the above embodiments.

The stator housing 220 of the first electric motor 1011 has a first connecting arm 1021; the rotor housing 330 of the second electric motor 1012 has a second connecting arm 1022, the stator housing 220 of the second electric motor 1012 has a third connecting arm 1023; the first electric motor 1011 and the second electric motor 1012 are connected through the first connecting arm 1021 and the second connecting arm 1022, one end of the first connecting arm 1021 is connected to one end of the second connecting arm 1022, and the first connecting arm 1021 is perpendicular to the second connecting arm 1022.

The rotor housing 330 of the third electric motor 1013 has a fourth connecting arm 1024, and the stator housing 220 of the third electric motor 1013 has a fifth connecting arm (not shown in the figure); the second electric motor 1012 and the third electric motor 1013 are connected through the third connecting arm 1023 and the fourth connecting arm 1024, one end of the third connecting arm 1023 is connected to one end of the fourth connecting arm 1024, and the third connecting arm 1023 is perpendicular to the fourth connecting arm 1024; and the fifth connecting arm (not shown in the figure) is connected to other parts or devices.

In other embodiments, at least one of the first electric motor 1011, the second electric motor 1012 and the third electric motor 1013 may further include a counterweight connecting arm (not shown in the figure) for adjusting the center of gravity of the gimbal 1000.

The embodiments of the present disclosure also provide a UAV. The UAV includes the above gimbal. Of course, the UAV may also include other parts not shown in the drawings, and the present disclosure has no limitation in this regard.

In summary, the electric motor 100, 800 or 900 in the embodiments of the present disclosure includes a stator assembly 200 and a rotor assembly 300 cooperating with the stator assembly 200, at least one of the stator assembly 200 and the rotor assembly 300 has a connecting arm 600, and the connecting arm 600 is a connecting piece for connecting the stator assembly 200 with other parts or for connecting the rotor assembly 300 with other parts. When assembling the multiple electric motors 100, 800 and 900 into the gimbal 1000, the step of connecting the connecting arm 600 with the stator housing 220 and the step of connecting the connecting arm 600 with the rotor housing 330 are reduced, thereby improving the assembly efficiency of the gimbal 1000.

The foregoing descriptions are merely preferred embodiments of the present disclosure, but by no means to restrict the present disclosure. It is conceivable for the skilled in this art to make various modifications and alterations in the present disclosure. Within the spirit and principle of the present disclosure, any modifications, equipollent substitution, modifications and the like should be encompassed within the protection scope of the present disclosure. Therefore, the protection scope of the present disclosure should be construed according to the protection scope defined by the claims.

The present disclosure claims the benefits of Chinese patent application No. 201620449324.8, which was filed on May 17, 2016 and is incorporated herein in its entirety by reference as part of this application.

What is claimed is:

1. An electric motor comprising:
   a stator assembly;
   a rotor assembly rotatably connected with the stator assembly; and
   wherein:
   the stator assembly comprises a stator housing for installation of a stator, the stator comprises an iron core and windings disposed around the iron core, the stator housing comprises a stator bottom wall and a stator sidewall connected to the stator bottom wall,
   the rotor assembly comprises a rotor housing for installation of a rotor, the rotor housing comprises a rotor bottom wall and a rotor sidewall connected to the rotor bottom wall, and
   the stator housing and the rotor housing each have a connecting arm, the connecting arm comprises one stator turning arm provided on the stator assembly and two rotor turning arms provided on the rotor assembly, and an extension direction of the stator turning arm is parallel to an extension direction of the rotor turning arm,
   wherein the electric motor further comprises a restricting mechanism, the restricting mechanism comprises a rotating member and a stopper member for stopping rotation of the rotating member,
   wherein the rotating member has a rod shape and is extended from an inner surface of the rotor bottom wall along an axial direction of the rotor bottom wall,
   wherein the stopper member is an arc-like block piece extending from a surface of the iron core along an axial direction of the stator bottom wall, and the stopper member comprises a first end and a second end, and
   wherein the rotating member is configured to be rotated between the first end and the second end of the stopper member.

2. The electric motor according to claim 1, wherein: the rotor bottom wall and the rotor turning arm are formed as one piece.

3. The electric motor according to claim 2, wherein the rotor sidewall, the rotor bottom wall and the rotor turning arm are formed as one piece.

4. The electric motor according to claim 2, wherein: the stator turning arm is provided on at least one of the stator sidewall and the stator bottom wall; and the rotor turning arm is provided on at least one of the rotor bottom wall and the rotor sidewall.

5. The electric motor according to claim 4, wherein: the rotor assembly further comprises a rotating shaft; the electric motor further comprises a magnetic ring connected to one end of the rotating shaft and a magnetic encoder connected to the stator bottom wall, and the magnetic encoder and the magnetic ring are separated from each other; and the magnetic ring comprises a top surface and a circumferential surface connected to the top surface, and the magnetic encoder faces the circumferential surface.

6. The electric motor according to claim 5, further comprising a bearing, wherein the bearing is disposed into a mounting hole opened into the stator bottom wall, and the rotating shaft for the rotor is installed into a bearing hole of the bearing.

7. The electric motor according to claim 4, wherein the stator bottom wall of the stator housing and the stator turning arm are formed as one piece.

8. The electric motor according to claim 7, wherein the stator turning arm comprises a lug boss comprising a mounting hole for installing a fastener.

9. A gimbal comprising an electric motor group, wherein at least one electric motor in the electric motor group is the electric motor according to claim 1.

10. The gimbal according to claim 9, wherein:
the electric motor group comprises a first electric motor, a second electric motor and a third electric motors;
a stator housing for the first electric motor has a first connecting arm;
a rotor housing for the second electric motor has a second connecting arm;
a stator housing for the second electric motor has a third connecting arm;
a rotor housing for the third electric motor has a fourth connecting arm;
the first connecting arm is perpendicularly connected to the second connecting arm; and
the third connecting arm is perpendicularly connected to the fourth connecting arm.

11. An unmanned aerial vehicle comprising the gimbal according to claim 9.

12. The electric motor according to claim 1, wherein:
the windings are arranged in a ring with a center to be a circle center of the iron core.

13. The electric motor according to claim 1, wherein the rotor is a tubular-shaped magnetic steel, and the rotor and the stator have an air gap therebetween.

14. The electric motor according to claim 1, wherein the stator turning arm and the stator housing are made from an identical material.

15. The electric motor according to claim 1, wherein the rotor turning arm and the rotor housing are made from an identical material.

* * * * *